(12) United States Patent
Gallagher et al.

(10) Patent No.: US 9,724,749 B2
(45) Date of Patent: Aug. 8, 2017

(54) CLIPPING TOOL

(71) Applicant: ROLLS-ROYCE PLC, London (GB)

(72) Inventors: Michael John Gallagher, Inverclyde (GB); John McBain, Glasgow (GB)

(73) Assignee: ROLLS-ROYCE PLC, London (GB)

( * ) Notice: Subject to any disclaimer, the term of this patent is extended or adjusted under 35 U.S.C. 154(b) by 64 days.

(21) Appl. No.: 14/613,918

(22) Filed: Feb. 4, 2015

(65) Prior Publication Data
US 2015/0239033 A1    Aug. 27, 2015

(30) Foreign Application Priority Data

Feb. 25, 2014 (GB) .................................. 1403261.9

(51) Int. Cl.
*B21J 5/02* (2006.01)
*B21D 24/16* (2006.01)
(Continued)

(52) U.S. Cl.
CPC .............. *B21J 5/027* (2013.01); *B21D 24/16* (2013.01); *B21J 5/002* (2013.01); *B21J 5/02* (2013.01);
(Continued)

(58) Field of Classification Search
CPC ... B21J 5/002; B21J 5/027; B21J 5/02; B21D 24/16; B21D 37/10; B21D 28/16;
(Continued)

(56) References Cited

U.S. PATENT DOCUMENTS

| 2,625,860 A * | 1/1953 | Plester ...................... B23C 3/00 409/181 |
| 5,187,967 A | 2/1993 | Singh et al. |
| 2006/0277961 A1* | 12/2006 | Miyahara ............... B21D 28/02 72/327 |
| 2009/0255316 A1* | 10/2009 | Murata ...................... B21J 5/02 72/345 |
| 2010/0196106 A1* | 8/2010 | Allen ...................... B23D 43/02 407/14 |

(Continued)

FOREIGN PATENT DOCUMENTS

JP    S49-64544 A    6/1974
JP    S5978741 A     5/1984
(Continued)

OTHER PUBLICATIONS

Jul. 14, 2015 Search Report issued in European Patent Application No. 15 15 3743.
(Continued)

*Primary Examiner* — Mohammad Yusuf
(74) *Attorney, Agent, or Firm* — Oliff PLC

(57) ABSTRACT

The present disclosure provides a clipping tool for clipping flash from a component e.g. a gas turbine aerofoil body. The clipping tool includes a riser having a support surface for supporting the component and a punch for gripping the component on the support surface such that the flash projects laterally from the riser and the punch. The clipping tool further comprises a tool body having a clipping aperture opening to a channel within the tool body. The channel is defined by a channel wall. The riser and the punch are translatable to shear the projecting flash from the gripped component. At least a portion of the channel wall within the tool body comprises a broaching surface having at least one projection, said projection reducing the cross sectional area of the channel to less than that of the clipping aperture.

15 Claims, 5 Drawing Sheets

(51) Int. Cl.
  *B21J 5/00* (2006.01)
  *B21K 3/04* (2006.01)
  *B23D 43/02* (2006.01)
(52) U.S. Cl.
  CPC ............... *B21K 3/04* (2013.01); *B23D 43/02* (2013.01); *Y10T 409/40175* (2015.01); *Y10T 409/400175* (2015.01); *Y10T 409/402625* (2015.01)
(58) Field of Classification Search
  CPC .. B21D 28/14; B23D 24/02; B23D 2043/025; B29C 51/445
  USPC ............... 72/334–352, 446; 264/163; 83/914
  See application file for complete search history.

(56) References Cited

U.S. PATENT DOCUMENTS

2012/0151755 A1* 6/2012 McBain ................... B21J 5/027
                                                                29/650

FOREIGN PATENT DOCUMENTS

JP      S61-119348 A    6/1986
JP      2007-210048 A   8/2007

OTHER PUBLICATIONS

Search Report issued in United Kingdom Application No. GB1403261.9 issued Jul. 3, 2014.

\* cited by examiner

CLIPPING TOOL

CROSS-REFERENCE TO RELATED APPLICATIONS

This application is based upon and claims the benefit of priority from British Patent Application Number 1403261.9 filed 25 Feb. 2014, the entire contents of which are incorporated by reference.

BACKGROUND

1. Field of the Disclosure

The present disclosure relates to a clipping tool for clipping a component and particularly, but not exclusively to a clipping tool for clipping a forged component such as a gas turbine aerofoil body.

2. Description of the Related Art

Metal components are forged by applying compressive loads to form the metal into the desired shape. This is conventionally achieved by placing the metal between two dies which are forced together such that the metal forms into the interior profile of the dies. In doing so, metal is often forced through the interface of the two dies, the parting line, creating a burr around the component, known as flash. The flash can be removed by a subsequent clipping or trimming process.

Conventionally, clipping processes use a clipping die to hold a component as it is forced through clipping steels having an aperture sized to the desired final shape of the component. The component is placed on top of the die so that the flash extends outside. The component is then forced through the opening in the clipping steels by a punch causing the flash extending outside the dies to be sheared from the component.

A clipping process is shown in FIGS. 1 and 2 for clipping components having an aerofoil surface, such as a compressor stator vanes or blades. The process uses a clipping die 2, as shown in FIG. 1, having a riser 4 and a base 6. The riser 4 comprises a support surface 8 for supporting the component above the base 6.

The riser 4 further comprises referencing members 12 disposed at opposing ends of the riser 4 adjacent to the support surface 8. A recess 14 is provided for receiving a root portion of the component.

As shown in FIG. 2, the riser 4 is located accurately within a tool body formed by a pair of clipping steels 16 (only one shown for diagrammatical purposes), one at each side of the riser 4. The riser 4 and base 6 are mounted on a hydraulic cylinder which provides a reaction force to counteract the force of a punch (not shown). The punch is driven down under hydraulic power to clamp the component on the riser 4 and drive the punch, component and riser 4 down through the clipping steels 16. As the punch, component and riser 4 pass through the clipping steels 16, flash is sheared off between the edges of the punch and the clipping steels 16.

This conventional process has been found to be effective where the flash has a thickness of less than around 1 mm. However, where the flash has a greater thickness, the edge cut by the clipping steels as the punch, component and riser 4 pass though the aperture in the clipping steels exhibits undesirable smearing. As a result, such an edge typically requires post-clipping machining in order to obtain the required geometry and edge surface finish.

Where the component is an aerofoil body for a gas turbine, the flash associated with the leading and trailing edges of the body are typically less than 1 mm and this can be effectively clipped using the known clipping tools. However, the flash associated with the tang portions at the opposing lateral ends of the aerofoil body is typically thicker e.g. around 3.5 mm and thus the tang portions are typically subjected to post-clipping machining to obtain the required tang geometry.

Post-clipping machining increases the cost and time scales of production of components. Furthermore, clipping of flash having an increased thickness leads to increased clipping tool wear.

OBJECTS AND SUMMARY

The present disclosure provides a clipping tool for clipping flash from a component, the clipping tool including:
  a riser having a support surface for supporting the component;
  a punch for gripping the component on the support surface such that the flash projects laterally from the riser and the punch; and
  a tool body having a clipping aperture opening to a channel within the tool body, the channel being defined by a channel wall, the riser and the punch being translatable within said channel to shear the projecting flash from the gripped component,
  wherein at least a portion of the channel wall within the tool body comprises a broaching surface having at least one projection, said projection reducing the cross sectional area of the channel to less than that of the clipping aperture.

The projection provided on the broaching surface within the channel has been found to reduce surface defects (e.g. smearing) on components having thicker flash (e.g. greater than 1 mm thickness). The bulk of the flash is clipped as the component on the riser moves through the clipping aperture into the channel and then the at least one projection on the broaching surface further clips/shears the component as the component descends within the channel.

Optional features will now be set out. These are applicable singly or in any combination with any aspect.

There may be a plurality of projections on the broaching surface. For example, there may be a first projection and a second projection. The second projection may further reduce the cross-sectional area of the channel or may project into the channel by substantially the same amount as the first projection.

The bulk of the flash is clipped as the component on the riser moves through the clipping aperture. The first projection reduces the component to the correct geometry and provides a semi-finish to the component edge and the second projection further reduces the smearing effect (e.g. by shearing off "spring-back" material) and provides the required surface finish to the component edge.

The or each projection may be a tooth, step or ridge such that the broaching surface is a toothed, stepped or ridged surface. The or each projection may have a cutting edge which projects into the channel. The cutting edge on the or each projection may be proximal the clipping aperture. The cutting edge may be formed by providing an angled edge surface on the or each projection, the angled edge surface extending from the cutting edge proximal the clipping aperture away from the axis of the channel.

The broaching surface may include an inlet adjacent the or each projection proximal the clipping aperture for collection of swarf to ensure that the clipping tool does not become clogged during repeated clipping operations.

The clipping tool may include a flushing mechanism for flushing swarf from the inlet(s). The flushing mechanism may be a pneumatic system. Such a pneumatic system includes at least one inlet air passage for carrying a blast of air/gas to the inlet(s) adjacent the projection(s) and at least one outlet passages for carrying swarf from the clipping tool.

An upper surface of the tool body surrounding the clipping aperture at the portion where the channel wall comprises a broaching surface may be recessed or channelled to allow accurate component location on the riser.

The broaching surface comprising the or each projection may be provided at two portions of the channel wall.

For embodiments intended to clip one or more tang portions, the broaching surface may be provided at one or both of the laterally opposing ends of the channel in the area where the tangs are clipped. In these embodiments, the transversally opposing sides of the channel wall (which will clip the leading and trailing edges of the aerofoil body) may be planar.

The tool body may be modular i.e. formed of a plurality of components. The tool body may be divided into components along a plane perpendicular to the axis of the channel.

For example, the tool body may comprise a plurality of plates, the plates being stacked one on top of another.

The stacked plates include a first plate defining the upper surface of the tool body and the clipping aperture. The first plate includes a first edge surface which forms part of the channel wall having the broaching surface. In some embodiments, the first edge surface is planar (in the axial direction of the channel) and the cross-sectional area of the channel defined by the first plate matches that of the clipping aperture.

The stacked plates include a second plate stacked below the first plate distal the clipping aperture. The second plate includes a second edge surface which forms part of the channel wall having the broaching surface. In some embodiments, the second edge surface is an angled second edge surface such that a second plate cutting edge is formed on the second edge surface proximal the clipping aperture, the angled second edge surface extending from the second plate cutting edge proximal the clipping aperture away from the axis of the channel.

The second plate (e.g. the second plate cutting edge) extends into the channel beyond the first edge surface to create the projection on the broaching surface, e.g. a projecting step between the first edge surface and the second edge surface (e.g. the second plate cutting edge), thus reducing the cross-sectional area of the channel to less than the cross-sectional area of the clipping aperture.

In embodiments with two projections on the broaching surface, the stacked plates further include a third plate stacked below the second plate distal the clipping aperture. The third plate includes a third edge surface which forms part of the channel wall having the broaching surface. In some embodiments, the third edge surface is an angled third edge surface such that a third plate cutting edge is formed on the third edge surface proximal the clipping aperture, the angled third edge surface extending from the third plate cutting edge proximal the clipping aperture away from the axis of the channel.

The third plate (e.g. the third plate cutting edge) extends into the channel beyond the first plate and may extend into the channel beyond the second plate to create a second projection on the broaching surface e.g. a projecting step between the second edge surface and the third edge surface (e.g. the third plate cutting edge), thus reducing the cross-sectional area of the channel even further. Alternatively, the third plate (e.g. the third plate cutting edge) may extend into the channel by substantially the same amount as the second plate.

The upper surface of the second plate and/or the third plate (adjacent the first plate and the second plate respectively) may be substantially planar. The upper surface(s) may include a respective trough adjacent the second/third edge surface(s), the trough(s) partly forming the inlet(s) for the collection of swarf. The or each trough may have an angled surface (e.g. angled at around 5 degrees) extending to the respective cutting edge.

The lower surface of the first plate and second plate may be substantially planar. The lower surfaces may include a respective cut-out adjacent the first/second edge surface(s), the cut-out(s) combining with the trough(s) in the adjacent edge surfaces to form the inlet(s) for the collection of swarf.

Each plate may have two laterally opposed edge surfaces (each as described above) forming laterally opposed portions of the channel wall each having a broaching surface. This is appropriate if the component to be clipped is an aerofoil body having laterally opposing tangs.

Each plate may have two transversally opposing edge surfaces extending between the respective laterally opposed edge surfaces. Each transversally opposing edge surface on each plate may be planar with no broaching surface. If the component to be clipped is an aerofoil body, the transversally opposing edge surfaces clip the leading and trailing edges.

At least a portion of the channel wall is coated with Diamolith™ coating which increases edge hardness and reduces friction to ensure extending tool life.

The riser may be hydraulically cushioned.

The component may be a forged component.

According to an aspect, there is provided a method of manufacturing a component comprising a forming step and a clipping step. In the forming step, the desired shape of the component is formed. The forming step results in the formation of flash. The clipping step comprises removing the flash formed in the forming step using the clipping tool as described and/or claimed herein.

The forming step may comprise forging. Such a forging step may comprise forcing two dies together. In such an arrangement, the flash may be formed at the interface of the two dies.

According to an aspect, there is provided a method of clipping flash from a formed component using a clipping tool as described and/or claimed herein.

The component may be an aerofoil component, for example of a gas turbine engine. Such an aerofoil component may be, for example, a compressor blade or vane or a turbine blade or vane.

BRIEF DESCRIPTION OF THE DRAWINGS

Arrangements will now be described by way of example with reference to the accompanying drawings in which.

DETAILED DESCRIPTION OF EMBODIMENTS

Figure 1:
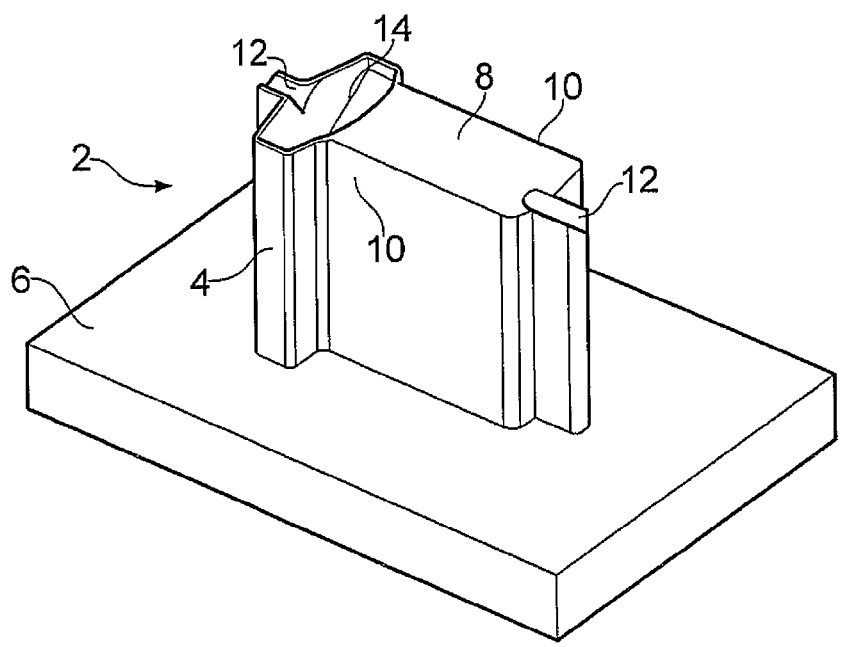
FIG. 1 is a perspective view of a conventional clipping die.
Figure 2:
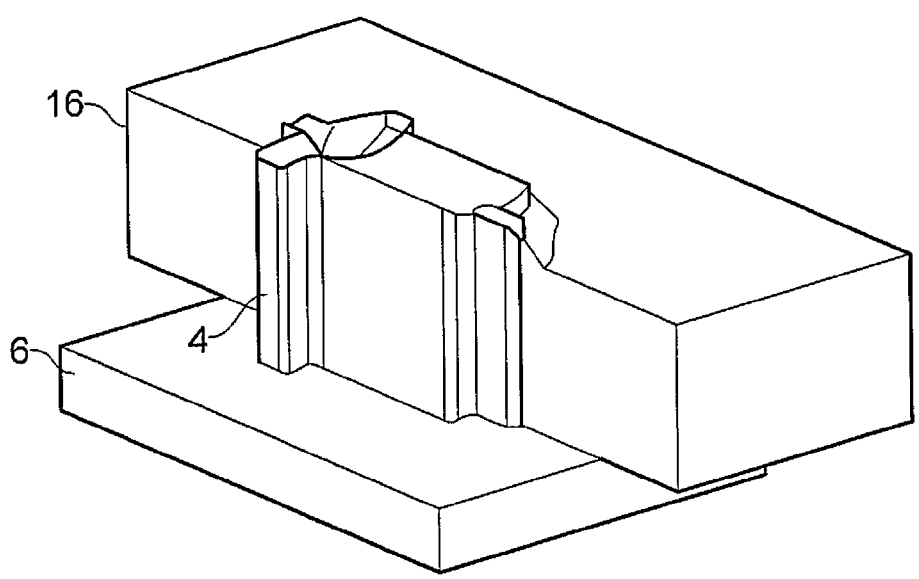
FIG. 2 is a perspective view of the clipping die of FIG. 1 and an associated clipping steel.
Figure 3:
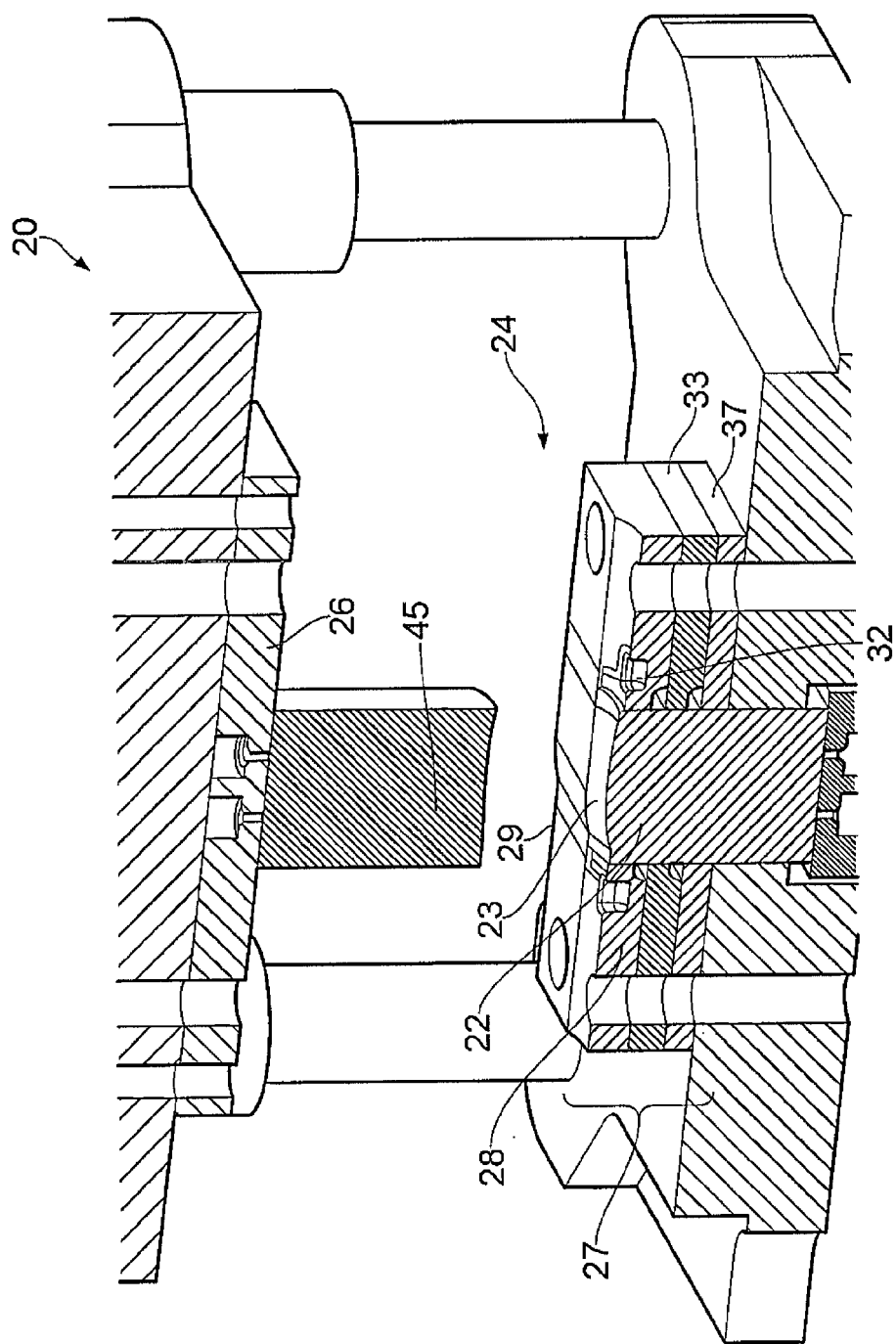
FIG. 3 shows a view of clipping tool according to first arrangement that is cut away along the centreline of the tool.
Figure 4:
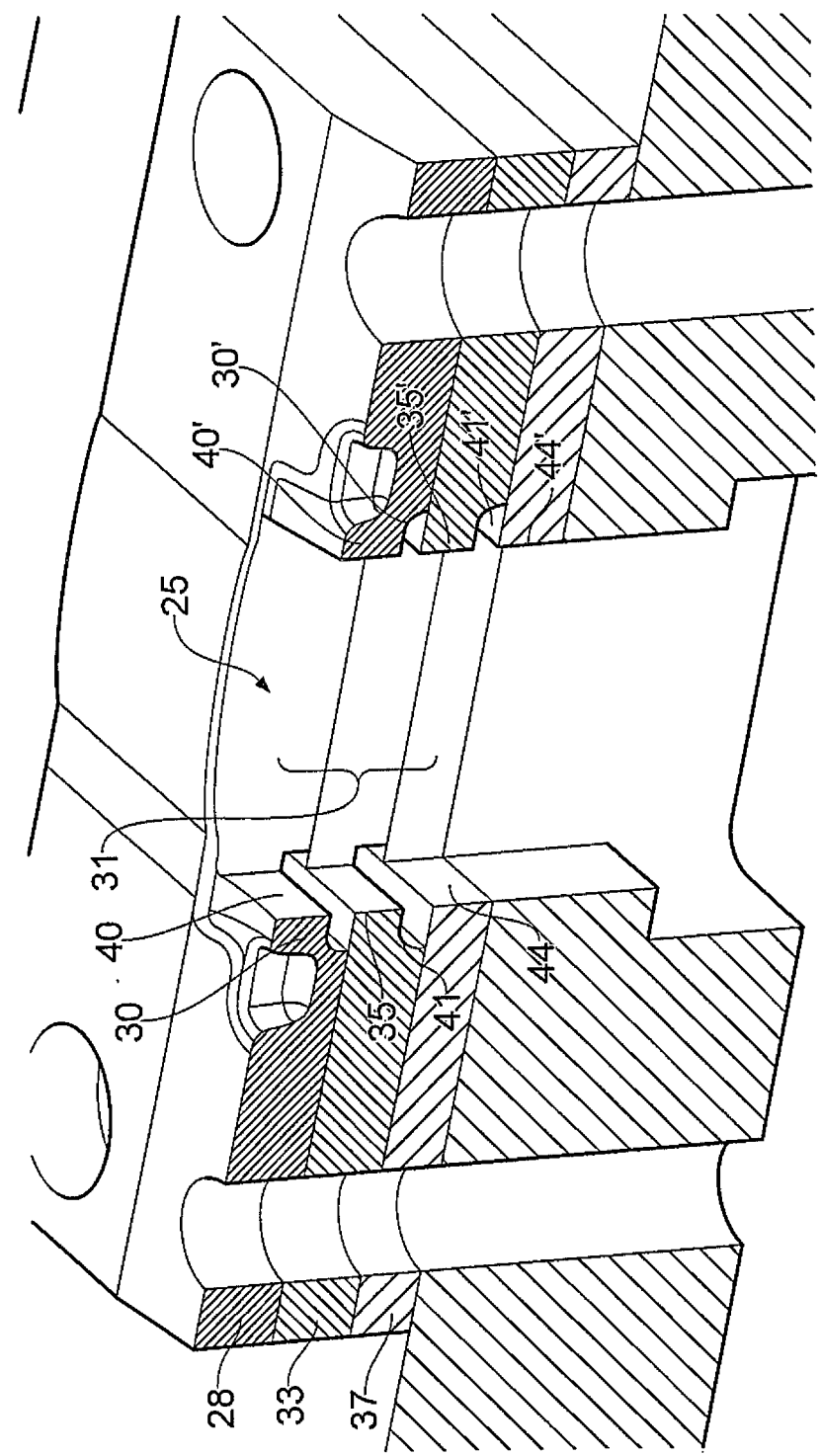
FIGS. 4 and 5 show cross-sectional views through view of the stacked plates of the first embodiment.
Figure 5:
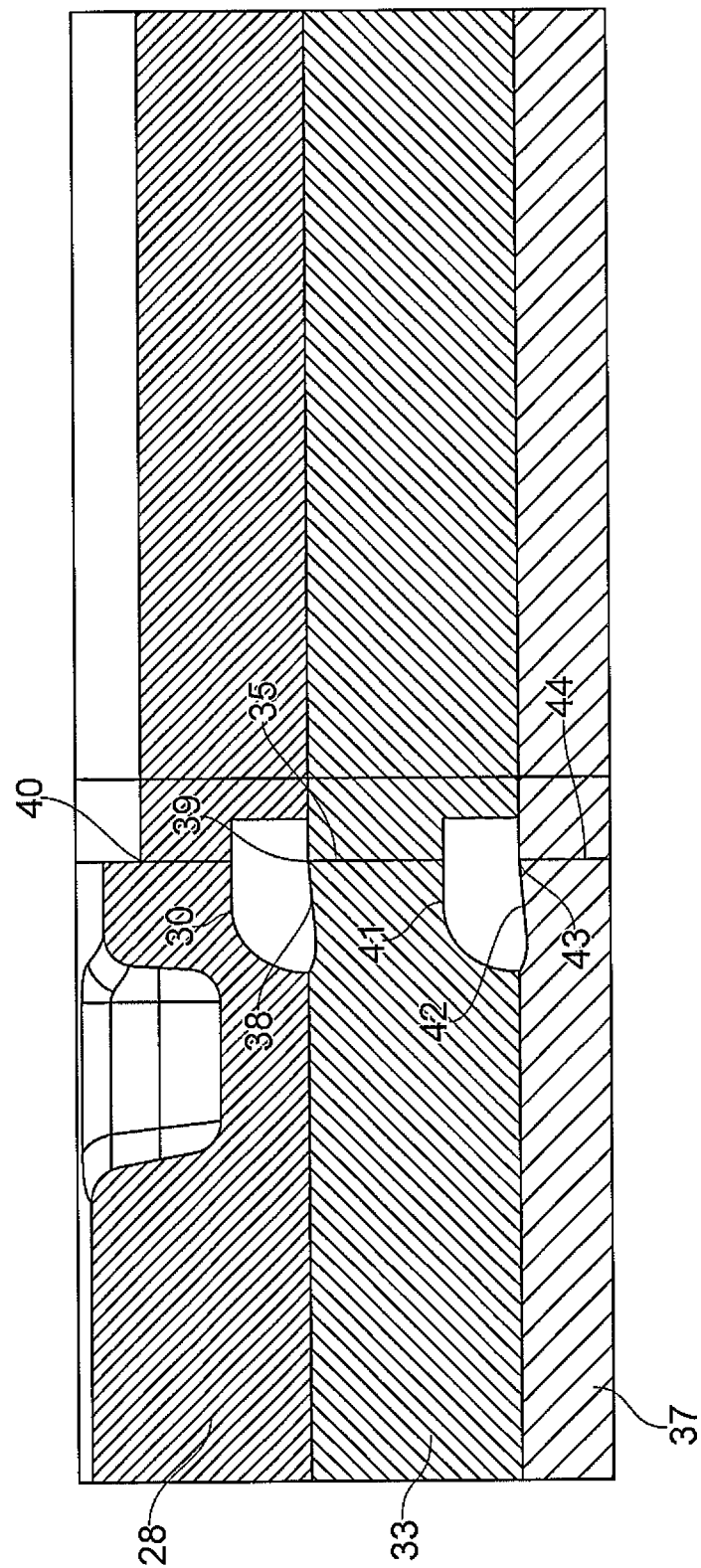

FIGS. 3 to 5 show features of a first arrangement of the present disclosure.

As shown in the perspective view of FIG. 3, the tool 20 includes a hydraulically cushioned riser 22 having a support surface 23 for an aerofoil blade having tang portions at opposing lateral ends. A modular tool body 24 surrounds the riser and provides a clipping aperture 25 opening to a channel (see FIG. 4 in which the riser is omitted) through which the riser can descend. An upper ram 26 carries a punch 45.

The modular tool body 24 comprises a set of plates 27.

The set of plates comprises a first plate 28 which defines the upper surface 29 of the tool body. The first laterally opposed edge surfaces 40, 40' of the first plate are substantially planar in the axial direction of the channel and partly form the clipping aperture 25 and the channel wall defining the channel. The cross-sectional area of the channel defined by the first edge surfaces 40, 40' of the first plates 28 matches that of the clipping aperture. The upper surface 29 defined by the first plate 28 includes laterally opposed troughs 32 allowing accurate positioning of the aerofoil body on the riser 22.

The lower surface of the first plate comprises cut-outs 30, 30' proximal the first edge surfaces, 40, 40'.

The set of plates 27 further includes a second plate 33.

The second laterally opposed edge surfaces 35, 35' of the second plate 33 are angled (at 2 degrees from vertical) from a respective second plate cutting edge 39, 39' away from the axis of the channel. The second plate cutting edges 39, 39' project into the channel beyond the first edge surfaces 40, 40' thus decreasing the cross-sectional area of the channel to less than that of the cross-sectional area of the clipping aperture 25.

The second plate 33 has a substantially planar upper surface (proximal the clipping aperture) with laterally opposed troughs 38, 38' which are angled at 5 degrees from horizontal away from the respective second plate cutting edge 39, 39' and are aligned with the respective cut-out 30, 30' on the lower surface of the adjacent first plate 28, to form an inlet for the collection of swarf.

The lower surface of the second plate comprises cut-outs 41, 41' proximal the second edge surfaces.

The set of plates 27 further includes a third plate 37.

The third edge surfaces 44, 44' of the third plate 37 are angled (at 2 degrees from vertical) from a respective third plate cutting edge 43, 43' away from the axis of the channel. The third plate cutting edges 43, 43' project into the channel by substantially the same amount as the second plate cutting edges 39, 39'.

The third plate has a substantially planar upper surface (proximal the clipping aperture) with laterally opposed troughs 42, 42' which are angled at 5 degrees from horizontal away from the respective third plate cutting edge and are aligned with the respective cut-out 41, 41' on the lower surface of the adjacent second plate 33 to form an inlet for the collection of swarf.

The clipping aperture 25 and the cross-sectional profile of the channel are essentially rectangular with the sets of edges surfaces of the plates 28, 33, 37 disposed at the laterally opposed ends for cutting the tang portions of the aerofoil body.

Each plate further comprises two transversally opposed edge surfaces which define a portion of the aperture/channel. Each transversely opposed edge has a planar clipping surface 31 which clips the leading and trailing edges of the aerofoil body.

At least a portion of the channel wall is coated with Diamolith™ coating which increases edge hardness and reduces friction to ensure extending tool life.

In use, a forged aerofoil body is deposited onto the riser 22, e.g. by a robotic arm (not shown). The upper ram 26 descends commencing the clipping stroke.

Firstly, the aerofoil body is gripped between the riser 20 and the punch 45. The riser 22 and the punch 45 descend through the clipping aperture 25 of the tool body 24 to sheer the flash from the aerofoil body. The flash on leading and trailing edges of the aerofoil body is clipped by the transversely opposed edge surfaces of the plates 28, 33, 37, each having a single, planar shearing edge 31.

The flash on the tang portions (which tends to be thicker (around 3.5 mm) than the flash on the leading/trailing edges (which typically has a thickness of around 1 mm)) is clipped by the edge surfaces of the set of plates 27 at opposing lateral ends of the channel.

The first edge surfaces 40, 40' of the first plate 28 clip the tang portions to the desired geometry.

The second plate cutting edges 39, 39' which project further into the channel then further clip the tang portions to obtain dimensional accuracy of the tang portions and to semi-finish the surface.

The third plate cutting edges 44, 44' finally clip any "spring-back" material from the tang portions to achieve the desired surface finish.

A pneumatic flushing system (not shown) forces air through the swell collection inlets formed between the first/second plates and second/third plates between each clipping action to flush the swarf from the tool body 24 to avoid clogging of the clipping tool.

Figure 6A:
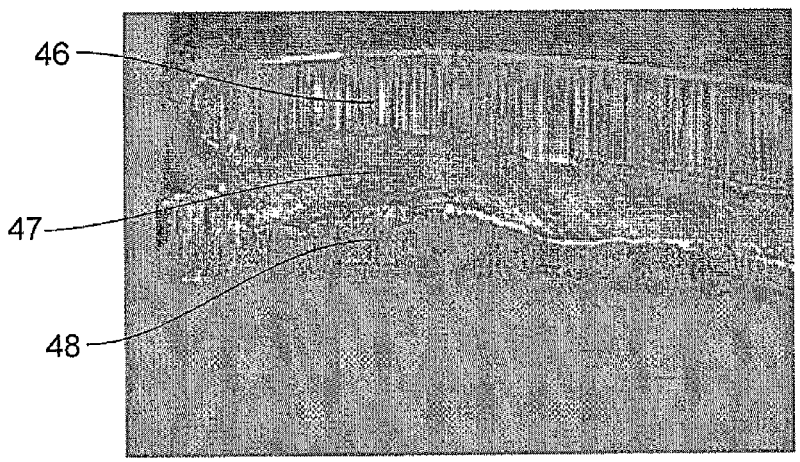
FIG. 6A shows a surface clipped using a conventional clipping tool.
Figure 6B:
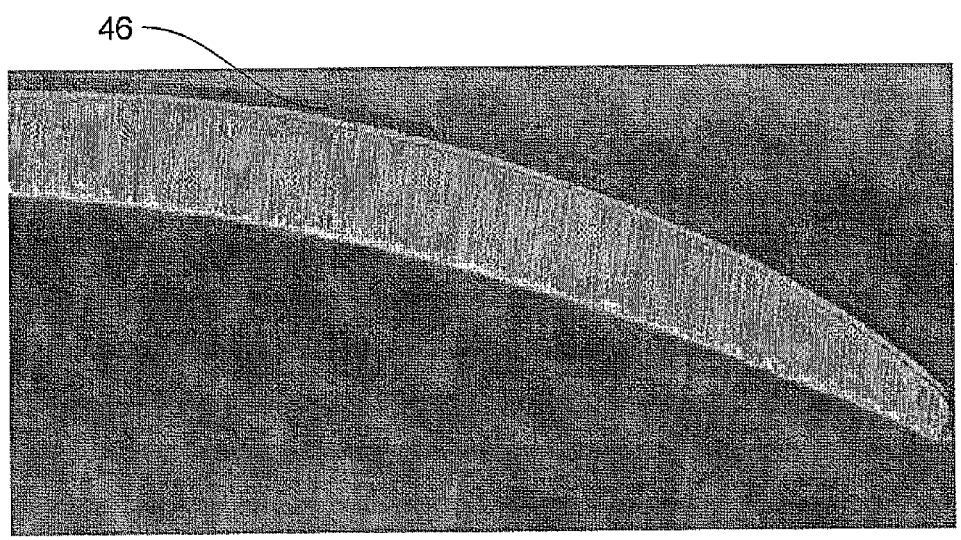
FIG. 6B shows a surface clipped using the first arrangement of the present disclosure.

FIGS. 6A and 6B show a comparison between a surface clipped using a conventional clipping tool (FIG. 6A) and a surface clipped by a clipping tool according to the present disclosure (FIG. 6B). The surface clipped by the conventional clipping tool exhibits a plastically deformed region 46, a sheered region 47 and a smeared region 48. The surface clipped by the clipping tool according to the present disclosure exhibits a much reduced plastically deformed region 46 and the sheered and smeared regions are effectively removed.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

All references referred to above are hereby incorporated by reference.

We claim:

1. A clipping tool for clipping flash from a component, the clipping tool comprising:
    a riser having a support surface for supporting the component;
    a punch for gripping the component between the punch and the support surface such that the flash projects laterally from the riser and the punch; and
    a tool body comprising a plurality of stacked plates in direct contact with each other and having a clipping aperture opening to a channel within the tool body, the channel being defined by a channel wall, and the riser and the punch being translatable together within the channel while gripping the component therebetween to shear the projecting flash from the gripped component, wherein:

at least a portion of the channel wall comprises a broaching surface formed by first and second ones of the plurality of stacked plates;

the first plate includes a first edge surface;

the second plate is stacked below the first plate so as to be distal the clipping aperture and includes a second edge surface proximal the clipping aperture that forms a second plate cutting edge; and the second plate cutting edge constitutes a projection by extending into the channel beyond the first edge surface to reduce the cross-sectional area of the channel to less than that of the clipping aperture.

2. A clipping tool according to claim 1, wherein there are a plurality of projections on the broaching surface.

3. A clipping tool according to claim 1, wherein the second edge surface is an angled edge surface that extends from the second plate cutting edge proximal the clipping aperture away from the axis of the channel.

4. A clipping tool according to claim 1, wherein the projection is a step, ridge or tooth.

5. A clipping tool according to claim 1, wherein the broaching surface includes an inlet adjacent the projection proximal the clipping aperture.

6. A clipping tool according to claim 5, further comprising a pneumatic flushing mechanism for flushing swarf from the inlet.

7. A clipping tool according to claim 1, wherein:
the clipping aperture and the channel have opposing lateral ends; and
the broaching surface is provided at one or both of the laterally opposing ends.

8. A clipping tool according to claim 1, wherein the first edge surface is a planar first edge surface.

9. A clipping tool according to claim 1, wherein:
the stacked plates include a third plate stacked below the second plate distal the clipping aperture;
the third plate includes an angled third edge surface such that a third plate cutting edge is formed on the third edge surface proximal the clipping aperture, the angled third edge surface extending from the third plate cutting edge proximal the clipping aperture away from the axis of the channel; and
the third plate cutting edge extends into the channel beyond the first edge surface.

10. A method of manufacturing a component, comprising:
forming a desired shape of the component and thereby forming flash; and
using the clipping tool of claim 1, removing the flash.

11. A method of manufacturing a component according to claim 10, wherein the component is an aerofoil component of a gas turbine engine.

12. A method of manufacturing a component according to claim 10, wherein the forming comprising forging.

13. A method of manufacturing a component according to claim 12, wherein the forging comprises forcing two dies together, the flash being formed at the interface of the two dies.

14. A method of clipping flash from a formed component using the clipping tool of claim 1.

15. A clipping tool for clipping flash from a component, the clipping tool comprising:
a riser having a support surface for supporting the component;
a punch for gripping the component between the punch and the support surface such that the flash projects laterally from the riser and the punch; and
a tool body comprising a plurality of stacked plates below the component and having a clipping aperture opening to a channel within the tool body, the channel being defined by a channel wall, and the riser and the punch being translatable together within the channel while gripping the component therebetween to shear the projecting flash from the gripped component, wherein:
at least a portion of the channel wall comprises a broaching surface formed by first and second ones of the plurality of stacked plates;
the first plate includes a first edge surface;
the second plate is stacked below the first plate so as to be distal the clipping aperture and includes a second edge surface proximal the clipping aperture that forms a second plate cutting edge; and
the second plate cutting edge constitutes a projection by extending into the channel beyond the first edge surface to reduce the cross-sectional area of the channel to less than that of the clipping aperture.

* * * * *